United States Patent [19]
Meeker et al.

[11] Patent Number: 6,138,137
[45] Date of Patent: Oct. 24, 2000

[54] METHODS AND APPARATUS FOR PERFORMING FAST DIVISION OPERATIONS IN BIT-SERIAL PROCESSORS

[75] Inventors: Woodrow Meeker; Michele D. Van Dyke-Lewis, both of Orlando, Fla.

[73] Assignee: TeraNex, Inc., Orlando, Fla.

[21] Appl. No.: 09/057,572

[22] Filed: Apr. 9, 1998

[51] Int. Cl.[7] .................................................. G06F 7/52
[52] U.S. Cl. ............................................................ 708/653
[58] Field of Search .................................. 708/650, 653, 708/655

[56] References Cited

U.S. PATENT DOCUMENTS

| | | | |
|---|---|---|---|
| 3,816,733 | 6/1974 | Sather | 708/655 |
| 5,771,182 | 6/1998 | Baker et al. | 708/655 |
| 5,946,223 | 8/1999 | Nakajima | 708/655 |

*Primary Examiner*—Tan V. Mai
*Attorney, Agent, or Firm*—Burns, Doane, Swecker & Mathis, LLP

[57] ABSTRACT

Methods and apparatus for quickly dividing multiple-bit operands using bit-serial processors include strategies for eliminating the number of steps required to execute conventional division operations. According to an exemplary embodiment, a conditional subtraction step, based on a quotient bit computed during a given pass, is combined with a compare step which is used to compute a next quotient bit and which, according to conventional techniques, is ordinarily computed during a subsequent pass. Additionally, exemplary embodiments provide a zero/non-zero mask for denominator bits which extend beyond a current most significant remainder bit during a given pass. As a result, not all denominator bits need be considered during every pass. Advantageously, the methods and apparatus of the invention can provide approximately a 3 to 1 speed improvement as compared to conventional techniques.

10 Claims, 3 Drawing Sheets

METHODS AND APPARATUS FOR PERFORMING FAST DIVISION OPERATIONS IN BIT-SERIAL PROCESSORS

Some aspects of the present invention were made with Government support under Contract No. F08630-95-2-0001 awarded by Air Force Wright Laboratory Armament Directorate. The Government may have certain rights in this invention.

FIELD OF THE INVENTION

The present invention relates to bit-serial processors, and more particularly, to methods and apparatus for performing division operations involving multiple-bit operands in bit-serial processors.

BACKGROUND OF THE INVENTION

Today, bit-serial processors are in widespread use. For example, bit-serial processors are commonly used to efficiently carry out pixel, or bit-plane, operations in image processing applications. See, for example, U.S. patent application Ser. No. 09/057/482, entitled "Mesh Connected Computer" (filed on even date herewith in the name of Abercrombie), which describes a system for performing image processing operations using arrays of coupled bit-serial processors. As the teachings of the present invention are useful in a system such as that described in the aforementioned patent application, the aforementioned patent application is incorporated herein in its entirety by reference. Those skilled in the art will appreciate, however, that the teachings of the present invention are broadly applicable in bit-serial processors generally, irrespective of the particular form of bit-serial processor in which the invention is employed.

Generally, and for purposes of the discussion that follows, a bit-serial processor is any processor including an arithmetic logic unit configured to operate on single-bit, or few-bit, data and/or control inputs. The arithmetic logic used to construct such a bit-serial processor is typically minimal, and such logic is most often used to access and process only single-bit operands within a given clock cycle. Thus, an individual bit-serial processor typically provides an elemental computing platform. However, when many bit-serial processors are coupled in a strategic fashion, they are quite powerful, and extremely fast, particularly in applications in which a common operation must be performed simultaneously on many single-bit, or few-bit, operands. Such is often the case, for example, in image processing applications, wherein entire pixel-data bit-planes are manipulated in unison. See, for example, the above incorporated patent application.

By definition, then, conventional bit-serial processors require many clock cycles to perform multi-pass operations such as multiplying or dividing two multiple-bit numbers. Whereas a multiple-bit processor can employ considerable arithmetic and control logic to enable multiple-bit computations to occur within a single or very few clock cycles, conventional bit-serial processors expend many clock cycles performing multiple-bit computations in a multiple-pass fashion. Nonetheless, an ability to quickly perform multiple-bit computations is often critical to the overall performance of a bit-serial processing application. Consequently, there is a need for improved methods and apparatus for performing multiple-bit operations using bit-serial processors.

SUMMARY OF THE INVENTION

The present invention fulfills the above-described and other needs by providing methods and apparatus for quickly dividing multiple-bit dividends by multiple-bit divisors using bit-serial processors. Advantageously, embodiments of the invention accomplish fast multiple-bit divisions using logic and memory architectures which are fully compatible with conventional bit-serial implementations. Thus, the present invention provides fast multiple-bit divisions while maintaining the true bit-serial nature of conventional architectures. As a result, embodiments of the invention provide all of the advantages of conventional bit-serial processors while also providing multiple-bit divisions which are several times faster as compared to conventional methods.

To provide fast division operations, the present invention discloses strategies for reducing the number of steps required to execute conventional division operations. For example, in a divide operation according to the invention, a conditional subtraction step, based on a quotient bit computed during a given iteration, is combined with a compare step which is used to compute a next quotient bit and which, according to conventional techniques, is ordinarily computed during a subsequent pass. Additionally, the present invention provides a zero/non-zero mask for denominator bits which extend beyond a current most significant remainder bit during a given pass. As a result, not all denominator bits need be considered during every pass. Advantageously, each of the above described methods independently provides a theoretical speedup approaching 2 to 1 as compared to conventional techniques and, in practice, the two methods combine to provide approximately a 3 to 1 overall speed improvement.

The above-described and other features and advantages of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

Figure 1:
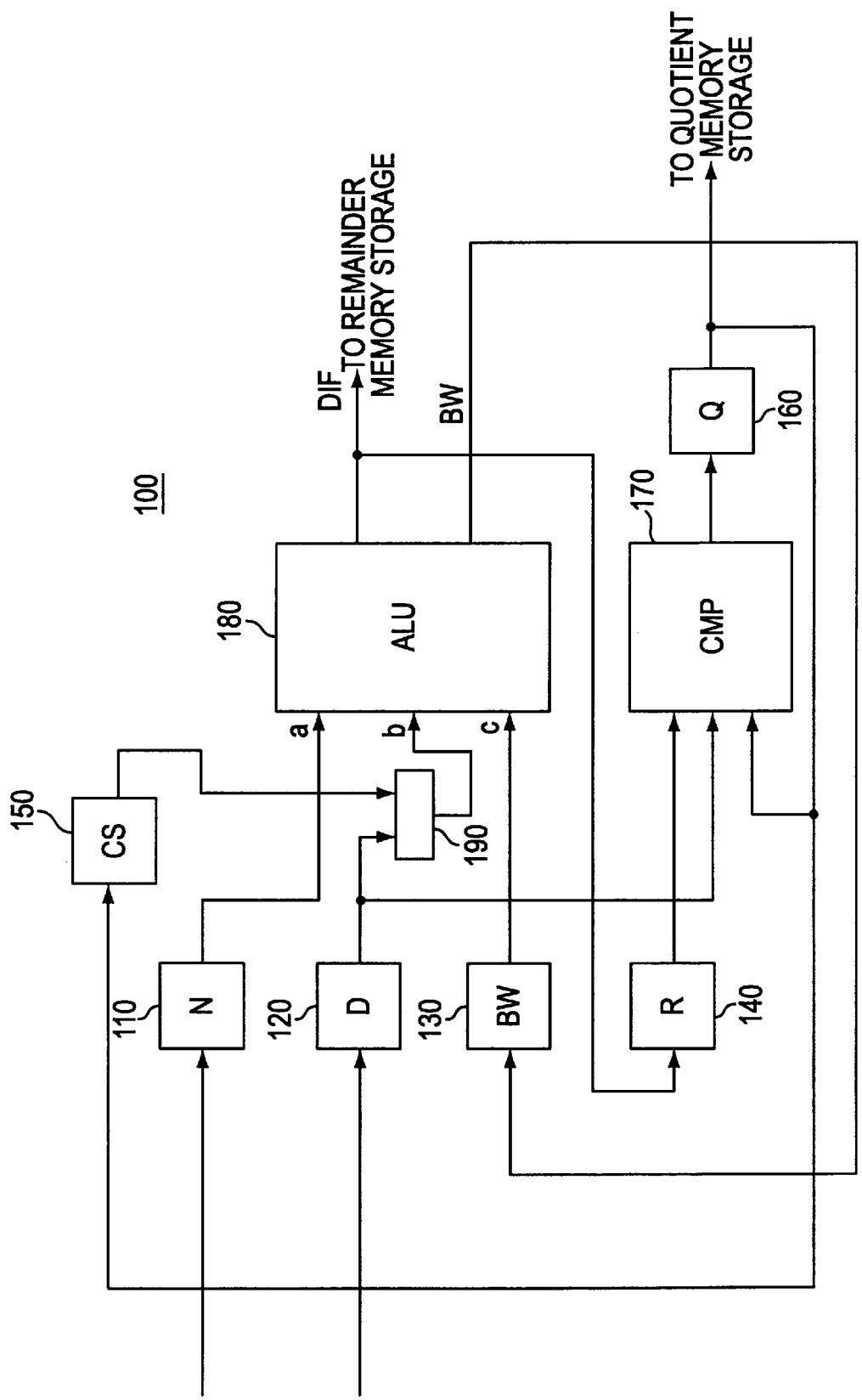
FIG. 1 depicts an exemplary bit-serial processor according to the invention, the exemplary processor providing for fast multiple-bit division operations.

FIG. 1 depicts an exemplary bit-serial processor 100 according to the invention. In FIG. 1, the bit-serial processor 100 includes a numerator bit register 110, a denominator bit register 120, a borrow bit register 130, a remainder bit register 140, a conditional subtract control bit register 150 and a quotient bit register 160. The exemplary bit-serial processor 100 also includes a comparator 170, an arithmetic logic unit 180 (configured to execute a bit-wise subtraction) and a logic device 190.

As shown, an output of the numerator, or dividend, bit register 110 is coupled to a first input a of the arithmetic logic unit 180, and an output of the denominator, or divisor, bit register 120 is coupled to a first input of the logic device 190. An output of the conditional subtract control bit register 150 is coupled to a second input of the logic device 190, and an output of the logic device 190 is coupled to a second input b of the arithmetic logic unit 180. A first, difference, output DIF of the arithmetic logic unit 180 is coupled to an input of the remainder bit register 140, and a second, borrow output BW of the arithmetic logic unit 180 is coupled to an input of the borrow bit register 130. An output of the borrow bit register 130 is coupled to a third input c of the arithmetic logic unit 180, and an output of the remainder bit register 140 is coupled to a first input of the comparator 170. The output of the denominator bit register 120 is coupled to a second input of the comparator 170, and an output of the comparator 170 is coupled to an input of the quotient bit register 160. An output of the quotient bit register 160 is fed back to a third input of the comparator and to an input of the conditional subtract register 150.

In operation, the exemplary bit-serial processor 100 of FIG. 1 carries out fast multiple-bit divisions according to the invention. To better illustrate the improved bit-serial division algorithms according to the invention, a short discussion of conventional bit-serial divide techniques is provided hereafter with reference to FIGS. 2 and 3. In the discussion that follows, the term pass is used to describe a series of bit operations or (in the context of bit serial processors) clock cycles. In other words, multiple bit operations can be executed in a single pass, and a single pass can thus include many clock cycles.

Figure 2:
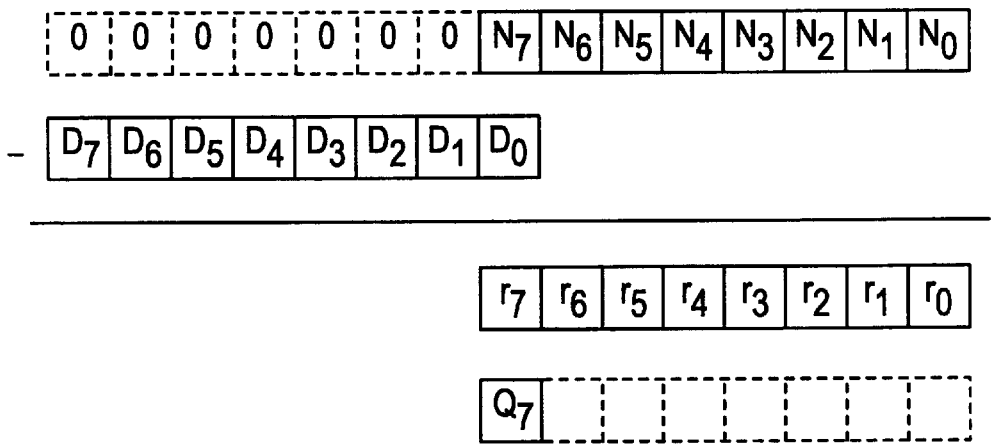
FIG. 2 depicts one step in a conventional division operation.
Figure 3:
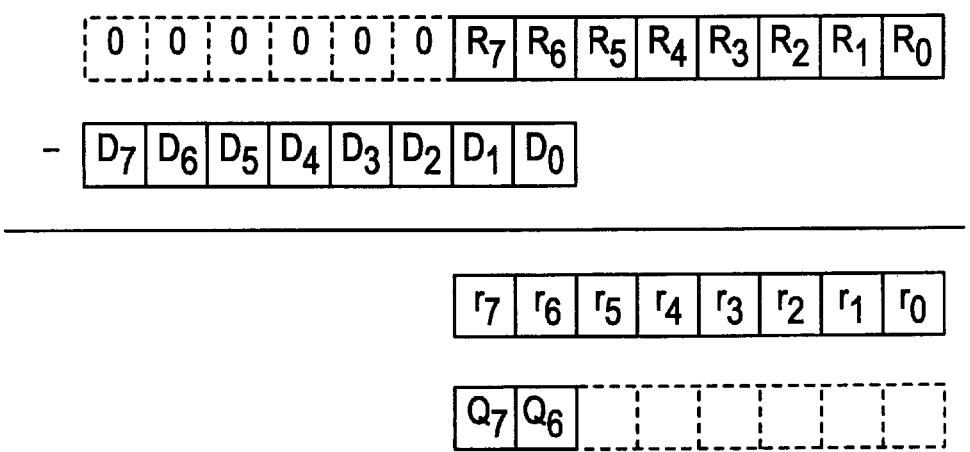
FIG. 3 depicts a second step in a conventional division operation.

FIGS. 2 and 3 depict exemplary results from first and second passes in a conventional bit-serial division algorithm. Generally, the conventional bit-serial unsigned divide algorithm is a straightforward series of compare and conditional subtract operations. In the first pass, the multiple-bit numerator is compared to a shifted version of the multiple-bit denominator, wherein the denominator is shifted with respect to the numerator so that the denominator least significant bit aligns with the numerator most significant bit as shown in FIG. 2. Note that in FIG. 2, 8-bit operands (i.e., an 8-bit numerator $N_7$–$N_0$ and an 8-bit denominator $D_7$–$D_0$) are used for purposes of illustration, but generally the operands may be of any bit length. Further, the numerator and the denominator may be of different lengths.

During the comparison operation, the size of the numerator is effectively extended by zero padding at the most significant end such that the extent of the numerator bits covers that of the denominator bits as shown in FIG. 2. Those skilled in the art will appreciate that the zero padding shown in FIG. 2 is conceptual in nature, and that such zero padding does not require any computation in practice. The shifted denominator is compared to the numerator, and the comparison result (i.e., binary 1 when the denominator is less than or equal to the numerator, binary 0 otherwise) is stored as the most significant bit for the quotient being computed. The most significant quotient bit $Q_7$ is then used to determine whether the denominator should be subtracted from the numerator to provide an updated remainder. Specifically, the shifted denominator is subtracted from the numerator to produce a new remainder (r=numerator–denominator) when the quotient bit $Q_7$ is binary 1. Otherwise, the remainder is set equal to the numerator (r=numerator).

Thereafter, a second pass is executed as shown in FIG. 3. The second pass is similar to the first pass except that, in the second pass, the numerator is replaced by the remainder r computed during the previous pass (shown as $R_7$–$R_0$ in FIG. 2), the denominator is shifted by 6 bits instead of 7 bits, and a next significant quotient bit $Q_6$ is computed and used as the basis for a conditional subtraction of the shifted denominator $D_7$–$D_0$ from the updated numerator $R_7$–$R_0$. Thereafter, an additional six passes, each similar to the second pass, are carried out to provide the remaining quotient bits. In each pass, the denominator is shifted 1 bit less as compared to the previous pass, the next lower quotient bit is computed, and the conditional subtract produces a new updated remainder.

According to the invention, an improved, faster divide algorithm can be achieved by combining the conditional subtract step in a given pass with the compare step for the subsequent pass. Specifically, since the conditional subtract step of a divide pass generates the remainder value for the following divide pass, the present invention achieves a speed improvement by diverting each remainder bit, once it is generated, into a comparison circuit which produces the quotient bit for the following pass. This aspect of the invention is depicted in FIG. 4.

Figure 4:
FIG. 4 depicts one step in a division operation according to the invention.
Figure 4:
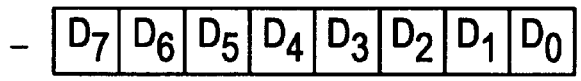
Figure 4:
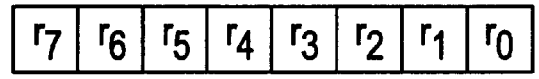
Figure 4:
Figure 4:

As shown, the remainder r computed during a given pass is the result of subtracting a suitably shifted version of the denominator D from the prevailing remainder R conditioned on the previously computed quotient bit ($Q_6$ in FIG. 4). At the same time, the next quotient bit ($Q_5$ in FIG. 4) is computed by comparing the denominator D to the newly updated remainder r. During the comparison, the denominator D is effectively shifted 1 less bit with respect to the newly updated remainder r (as compared to the amount the denominator D is shifted with respect to the previously computed remainder R).

This aspect of the invention can be implemented, for example, in the bit-serial processor 100 of FIG. 1. In operation, bits of a numerator N (or a prevailing remainder R after a first pass) are serially input to the numerator bit register 110, and bits of a denominator D are serially input to the denominator bit register 120. The numerator bits are passed serially to the first input (a) of the arithmetic logic unit 180, and the conditional subtract control bit register 150, loaded based on a previously computed quotient bit as described below, selectively passes the denominator bits serially to the second input b of the arithmetic logic unit 180 via the logic device 190. The arithmetic logic unit 180 bit-wise subtracts the denominator from the numerator, using borrow bits provided by the borrow bit register 130, to produce updated remainder bits r at the difference output DIF and borrow out bits at the borrow output BW. The new remainder bits r are passed serially to the remainder bit register 140, and the borrow out bits are fed serially back to the borrow bit register 130 for input to the arithmetic logic unit 180.

The comparator 170 serially compares the updated remainder bits (output by the remainder bit register 140) to appropriate denominator bits (output by the denominator bit register 120). While a given remainder bit $r_i$ is being compared to a denominator bit, the arithmetic logic unit 180 is generating the next remainder bit $r_{i+1}$. Thus, the denominator bit which is subtracted from the numerator bit $N_{i+1}$, (or prevailing remainder bit $R_{i+1}$ after a first pass) is the same denominator bit that is compared to the updated remainder bit $r_i$. In this manner, each updated remainder bit r is matched to a next higher denominator bit (for computation of a new quotient bit) as compared to the corresponding existing remainder bit R (used for the conditional subtract). Therefore, the compare function is effectively performed for the subsequent pass during the generation of the remainder in the current pass.

On each clock cycle, the quotient register 160 records a binary 1 if the updated remainder bit r is greater than the denominator bit, a binary 0 if the updated remainder bit r is less than the denominator bit, and retains the previous value if the updated remainder bit r and the denominator bit are equal (as shown, the previous value can be retained by feeding the output of the quotient bit register 160 back to the third input of the comparator 170). Thus, at the end of a pass, the quotient bit register 160 contains a new quotient bit Q which is stored and/or output and fed to the conditional subtract control bit register 150 to condition the subtract for the next pass.

Exemplary embodiments of the components of FIG. 1 (e.g., the comparator 170, the arithmetic logic unit 180 and the logic device 190) are described, for example, in the above incorporated patent application (entitled "Mesh Connected Computer") and in U.S. patent application Ser. No. 09/057,571, entitled "Methods and Apparatus for Performing Fast Multiplication Operations in Bit-Serial Processors", which also is incorporated herein in its entirety by reference. Advantageously, the components of FIG. 1 are typically found, or are easily incorporated, within most bit-serial processors (see, for example, the above cited patent applications). Thus, the above described fast divide algorithm adds little complexity and maintains true bit-serial functionality. Accordingly, bit-serial processors constructed in accordance with the invention simultaneously provide fast multiple-bit division capabilities as well as all the advantages typically associated with conventional bit-serial processors.

Another speed improvement according to the invention is based on a recognition that on a given pass (i), only the lowest (i) denominator bits are used during the conditional subtract. In other words, if the previous compare result is true (i.e., the prevailing remainder was greater than the shifted denominator), it is a given that all unread denominator bits (i.e., those aligned beyond the most significant bit of the prevailing remainder R) are zero. Indeed, if any unread denominator bit were not zero, the previous compare would have failed since the effective denominator value would have to be greater than the remainder. In other words, one of the denominator bits which matches up with a padded zero must be a binary 1, and the subtraction cannot take place. Thus, to determine whether the compare is false, it is only necessary to know whether any one of the denominator bits aligned with a padded zero is itself non-zero.

Rather than examine every denominator bit that aligns with a padded zero, a pre-computed mask bit $M_i$ (which is set to binary 1 if any unread denominator bit is not zero, and to binary 0 otherwise) can be consulted. Generating a string of mask bits (i.e., $M_{7:0}$, where each bit $M_i$ represents the condition that at least one of $D_{7:i}$ is 1 for an 8-bit denominator) is straightforward and requires relatively few clock cycles (equal to the number of denominator bits). Advantageously, the quotient bit memory storage area (see FIG. 1) can be used as temporary storage for the mask image M since each mask bit $M_i$ can be discarded when used, and replaced by the newly generated quotient bit.

Figure 5:
FIG. 5 depicts another step in a division operation according to the invention.
Figure 5:
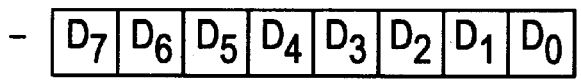
Figure 5:
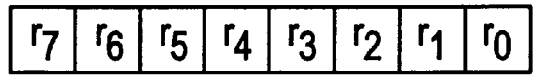
Figure 5:
Figure 5:
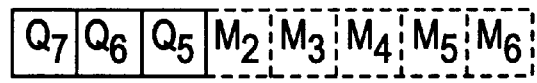

This aspect of the invention is depicted in FIG. 5 and can be easily implemented, for example, via the bit-serial processor 100 of FIG. 1. Thus, additional speed increases can be achieved without adding complexity or deviating from the true bit-serial nature of the processor, and processors constructed in accordance with this aspect of the invention can provide fast divide operations while also providing all the advantages of conventional bit-serial devices. Advantageously, each aspect of the invention (i.e., combining compares with conditional subtracts and using a mask string to avoiding considering denominator bits unnecessarily) independently provides nearly a twofold increase in division speed as compared to conventional algorithms. In practice, the aspects of the invention provide approximately a threefold increase in division speed.

Those skilled in the art will appreciate that the present invention is not limited to the specific exemplary embodiments which have been described herein for purposes of illustration and that numerous alternative embodiments are also contemplated. The scope of the invention is therefore defined by the claims which are appended hereto, rather than the foregoing description, and all equivalents which are consistent with the meaning of the claims are intended to be embraced therein.

We claim:

1. A method of dividing a multiple-bit numerator by a multiple-bit denominator, comprising the steps of:

bit-wise generating a next remainder that is alternatively equal to a current remainder when a first quotient bit is binary 0, and equal to a value representing a difference between the current remainder and a first shifted version of the denominator when the first quotient bit is binary 1; and simultaneously comparing bits of the next remainder with bits of the denominator to generate a second quotient bit, wherein the second quotient bit is set to binary 1 if a second shifted version of the denominator is less than or equal to the next remainder and set to binary 0 otherwise.

2. The method of claim 1, wherein a first pass of said method comprises the steps of:

bit-wise generating a first remainder that is alternatively equal to the numerator when a most significant quotient bit is binary 0, and equal to a value representing a difference between the numerator and a shifted version of the denominator when the most significant quotient bit is binary 1; and simultaneously comparing bits of the first remainder with bits of the denominator to generate a next most significant quotient bit, wherein the next most significant quotient bit is set to binary 1 if a next shifted version of the denominator is less than or equal to the first remainder and set to binary 0 otherwise.

3. The method of claim 1, wherein the step of comparing bits of the next remainder with bits of the denominator comprises the steps of:

comparing bits of the next remainder with a first set of bits of the denominator; and completing the comparing step by consulting a mask bit to determine whether any of a remaining set of bits of the denominator is non-zero.

4. The method of claim 3, wherein the mask bit is stored at a location that is allocated to store a quotient bit that has not yet been generated.

5. A method of comparing a remainder with bits of a multiple-bit denominator for use in dividing a multiple-bit numerator by the multiple-bit denominator, wherein the method comprises the steps of:

comparing bits of the remainder with a first set of bits of the denominator; and completing the comparison by consulting a mask bit to determine whether any of a remaining set of bits of the denominator is non-zero.

6. The method of claim 5, wherein the mask bit is stored at a location that is allocated to store a quotient bit that has not yet been generated.

7. A device for dividing a multiple-bit numerator by a multiple-bit denominator, comprising:

means for bit-wise generate a next remainder, wherein the next remainder is set equal to a current remainder when a first quotient bit is binary 0, and set equal to a value representing a difference between the current remainder and a first shifted version of the denominator when the first quotient bit is binary 1; and means for simultaneously comparing bits of the next remainder with bits of the denominator to generate a second quotient bit, wherein the second quotient bit is set to binary 1 if a second shifted version of the denominator is less than or equal to the next remainder and set to binary 0 otherwise.

8. The device of claim 7, wherein said means for comparing bits of the next remainder with bits of the denominator comprises:

means for comparing bits of the next remainder with a first set of bits of the denominator; and means for completing the comparison by consulting a mask bit to determine whether any of a remaining set of bits of the denominator is non-zero.

9. The device of claim 8, further comprising memory storage, wherein the mask bit is stored at a location within said memory storage that is allocated to store a quotient bit that has not yet been generated.

10. A device for comparing a remainder with bits of a multiple-bit denominator for use in dividing a multiple-bit numerator by the multiple-bit denominator, wherein the device comprises:

means for comparing bits of the remainder with a first set of bits of the denominator; and means for completing the comparison of the remainder with bits of the denominator by consulting a mask bit to determine whether any of a remaining set of bits of the denominator is non-zero.

* * * * *